United States Patent

Mehren et al.

[11] Patent Number: 5,947,550
[45] Date of Patent: Sep. 7, 1999

[54] COMMERCIAL VEHICLE HAVING A DRIVER'S CAB AND A TRANSPORT CONTAINER SEPARATED THEREFROM

[75] Inventors: Herbert Mehren; Matthias Nohr, both of Stuttgart, Germany

[73] Assignee: Daimler-Benz AG, Stuttgart, Germany

[21] Appl. No.: 08/850,741

[22] Filed: May 2, 1997

[30] Foreign Application Priority Data

May 2, 1996 [DE] Germany ............................ 196 17 565

[51] Int. Cl.⁶ .................................................. B62D 23/00
[52] U.S. Cl. ........................ 296/188; 296/189; 296/183; 296/35.1; 296/184; 188/371
[58] Field of Search ..................... 296/189, 188, 296/183, 35.2, 35.1, 40, 184; 188/371; 293/133; 298/17 B

[56] References Cited

U.S. PATENT DOCUMENTS

| | | | |
|---|---|---|---|
| 2,959,446 | 11/1960 | Thompson | 296/189 |
| 3,831,998 | 8/1974 | Hewitt | 296/189 |
| 3,861,736 | 1/1975 | Rossler | 296/189 |
| 3,955,640 | 5/1976 | Ymanaka | 296/189 |
| 3,981,530 | 9/1976 | Yamanaka et al. | 296/189 |
| 3,993,352 | 11/1976 | Yamanaka | 296/183 |
| 4,054,314 | 10/1977 | Yamanaka | 296/183 |
| 4,175,634 | 11/1979 | Yamanaka | 296/189 |
| 4,951,999 | 8/1990 | Rudolph et al. | 296/56 |
| 4,988,081 | 1/1991 | Dohrmann | 188/371 |
| 5,174,421 | 12/1992 | Rink et al. | 188/371 |
| 5,293,973 | 3/1994 | Thum | |
| 5,403,113 | 4/1995 | Gertz et al. | 188/371 |
| 5,588,511 | 12/1996 | Kallenback | 188/371 |

FOREIGN PATENT DOCUMENTS

| | | |
|---|---|---|
| 2 147 012 | 3/1973 | France . |
| 1 172 558 | 1/1965 | Germany . |
| 24 62 816 | 3/1980 | Germany . |
| 42 41 108 A1 | 6/1993 | Germany . |
| 36825 | 4/1978 | Japan .................................. 296/188 |
| 2-227382 | 9/1990 | Japan . |

*Primary Examiner*—D. Glenn Dayoan
*Assistant Examiner*—Long Bao Nguyen
*Attorney, Agent, or Firm*—Evenson, McKeown, Edwards & Lenahan, P.L.L.C.

[57] ABSTRACT

A commercial vehicle having a driver's cab, a chassis and a transport container. The transport container holds cargo, which is movably disposed therein. The transport container is fastened at a distance behind the driver's cab in the driving direction via impact-energy-absorbing bearings mounted on the chassis. The bearings are constructed and arranged to absorb impact energy particularly in the driving direction. The impact-energy-absorbing bearings prevent an uncontrolled impact of the transport container onto the driver's cab in the case of a collision.

9 Claims, 2 Drawing Sheets

 …

COMMERCIAL VEHICLE HAVING A DRIVER'S CAB AND A TRANSPORT CONTAINER SEPARATED THEREFROM

BACKGROUND AND SUMMARY OF THE INVENTION

This application claims the priority of German Application No. 196 17 565.8 filed in Germany on May 2, 1996, the disclosure of which is expressly incorporated by reference herein.

The invention relates to a commercial vehicle having a driver's cab and a transport container separated therefrom, and more particularly to such a commercial vehicle wherein the transport container is fastened on the chassis via bearings.

Because of inertia-caused relative movements of the cargo with respect to the transport container during collisions, the transport container may be pushed onto the driver's cab. As a result, the crew in the driver's cab may be jammed between the transport container and the obstacle with which the vehicle has collided.

It is an object of the invention to prevent an uncontrolled impact of the transport container onto the driver's cab in the case of a collision.

This and other objects have been achieved according to the present invention by providing a commercial vehicle having a driver's cab, a chassis and a transport container which is fastened via a plurality of bearings on the chassis behind the driver's cab, the bearings being constructed to absorb impact energy in a driving direction, wherein a wall of the transport container which is adjacent the driver's cab is supported in a vertically upper area via a tension support diagonally extending to one of the bearings which is situated proximate the rearward end of the chassis.

The invention is based on the general idea of disposing the transport container on the chassis of a commercial vehicle of the above-mentioned type on bearings having force-absorbing elements which may also be called "crash elements."

Other objects, advantages and novel features of the present invention will become apparent from the following detailed description of the invention when considered in conjunction with the accompanying drawings.

DETAILED DESCRIPTION OF THE DRAWINGS

Figure 1:
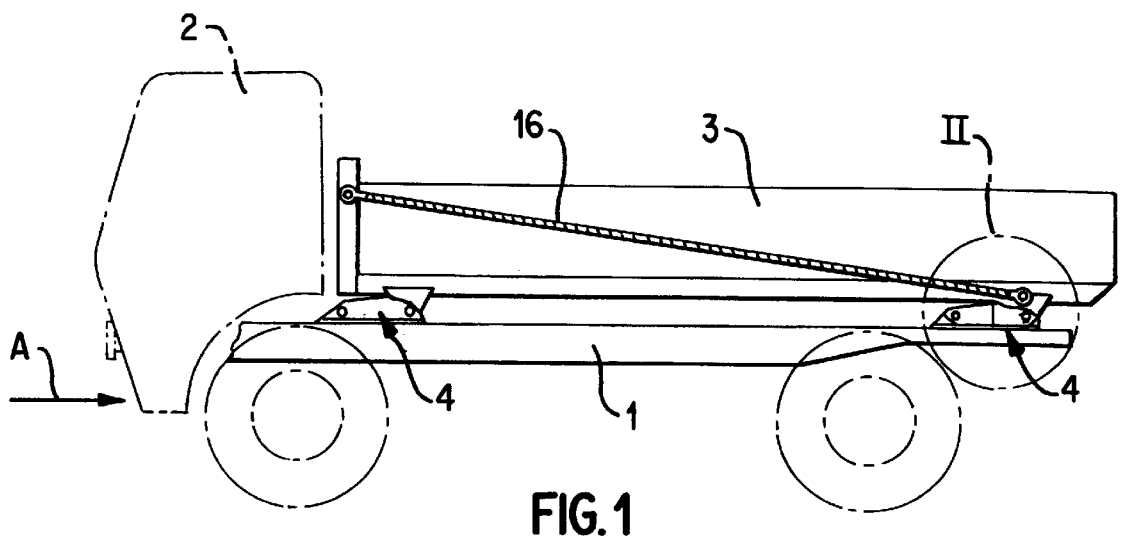
FIG. 1 is a side view of transport container disposed on a chassis of a commercial vehicle according to a preferred embodiment of the present invention.

Referring to FIG. 1, a driver's cab 2 is connected in front in the driving direction with a rigid chassis 1 of a commercial vehicle.

At a distance behind the driver's cab 2, a transport container 3 in the form of a flatbed body, is disposed on the chassis 1 by way of bearings 4.

Figure 2:
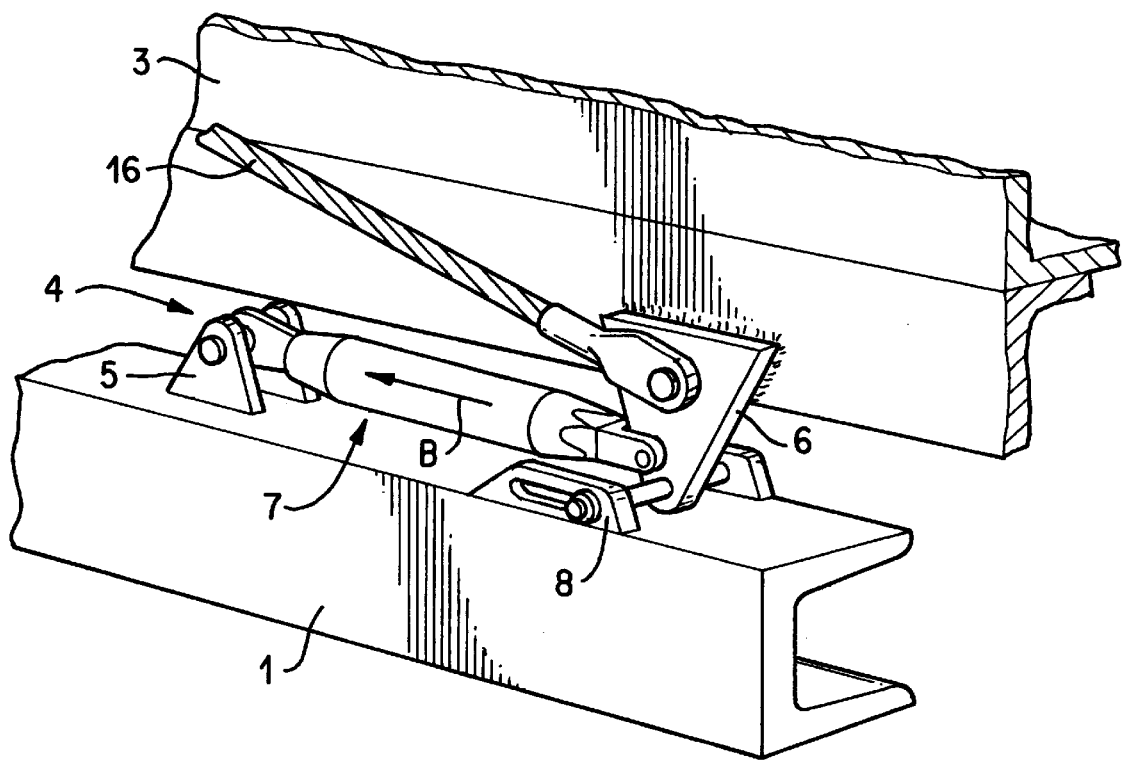
FIG. 2 is an enlarged perspective view of detail area II of FIG. 1 of one embodiment of a bearing between the transport container and the chassis.

In the embodiment according to FIG. 2, the bearings 4 are applied to the transport container 3 in the front and the rear, on the one hand, between abutments 5 on the chassis and, on the other hand, abutments 6 on the transport container 3. The bearings 4 have force-absorbing elements 7 arranged between the abutments 5 and the abutments 6. The abutments 6 of the transport container 3 are displaceably disposed in the driving direction on the chassis 1 via one bearing 8, respectively. The force-absorbing elements 7 have a form which is elongated in the driving direction of the vehicle.

Figure 3:
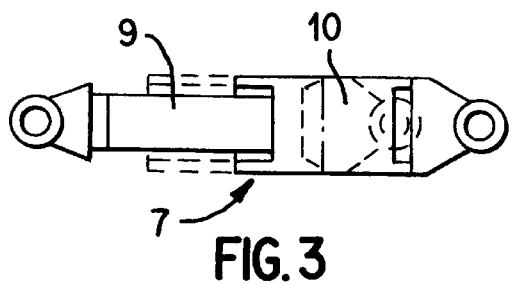
FIG. 3 is a view of one embodiment of a force-absorbing element of a bearing according to the present invention.
Figure 4:
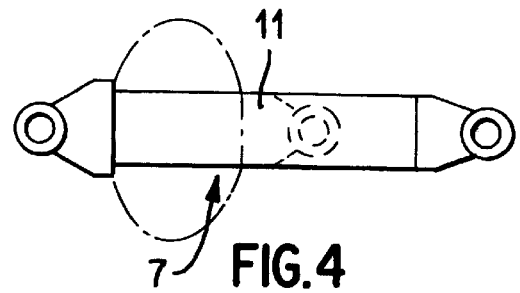
FIG. 4 is a view of another embodiment of a force-absorbing element of a bearing according to the present invention.

Impact-absorbing elements are known per se and can be applied in the present invention. FIGS. 3 and 4 illustrate various embodiments of force-absorbing elements which can be used to absorb energy.

In the embodiment according to FIG. 3, such an element 7 consists of metal tubes 9 and 10 which can be telescopically pushed into one another and whose outside walls are connected with one another in one piece. When being pushed into one another, as the result of the pushing-in of the tube 9, the outside wall of the tube 10 is bent in a rolling and therefore force-consuming manner together with the inside tube 9. The energy absorption effect is created when the inside tube 9 is pushed into the outside tube 10. In this case, the whole respective tube cross-section is rolled, that is, bent forward and backward by 180° respectively. The deformation takes place in a known rolling manner, for example as shown in German patent document 1,172,558. The chain line in FIG. 3 shows a deformed state of the force-absorbing element 7.

In the embodiment according to FIG. 4, the center part 11 of the force-absorbing element 7 is made of a fiber-reinforced plastic material which can deform in an energy-consuming manner during a vehicle crash. Special embodiments of such so-called crash elements are known per se. In the case of the fiber-reinforced plastic material, fibers and, for example, resin, as the binder, are destroyed, in which case the fibers are torn and the resin is ripped open. The chain line in FIG. 4 shows a deformed state of the force-absorbing element 7.

Figure 5:
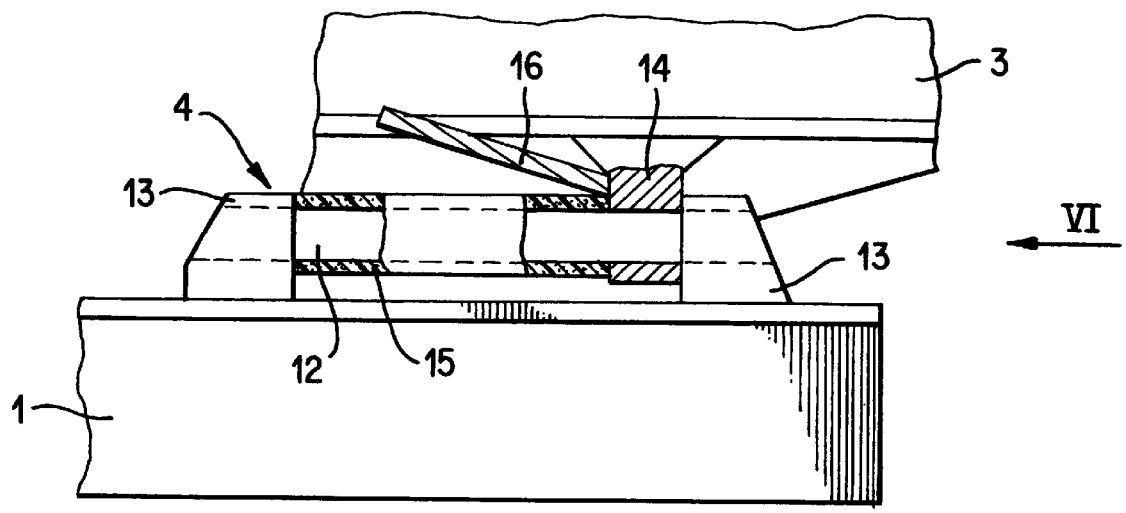
FIG. 5 is an enlarged perspective view of detail area II of FIG. 1 of another embodiment of a bearing between the transport container and the chassis.
Figure 6:
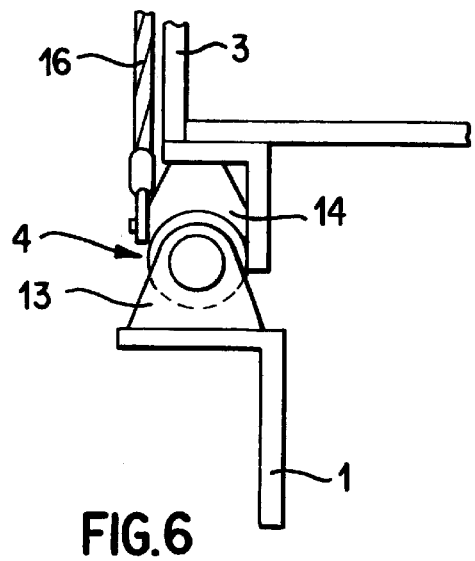
FIG. 6 is an end view taken in the direction of arrow VI of the bearing in FIG. 5.

In an embodiment of the bearings according to FIG. 5, the chassis-side abutments each consist of an elongated guiding element 12 in the form of a cylindrical rod which is aligned in the driving direction and which is, in each case, fixedly connected only on the front side by way of a cap 13 with the chassis 1. The abutments 6 of the transport container 3 are constructed as bearing lugs 14 which are longitudinally displaceably disposed on the guiding elements 12. In this case, the bearing lugs 14 are assigned with respect to the position to the caps 13 situated in the rear in the driving direction. In the area situated between the forward caps 13 and the bearing lugs 14, the guiding element 12 is enclosed by a sleeve 15 made of a force-absorbing plastic material which may be a fiber-reinforced plastic. When such a force-absorbing element is destroyed, kinetic energy can be absorbed to a high degree.

Also in the case of a rear impact onto the transport container 3, the force-absorbing elements 7 according to the present invention advantageously have an energy-absorbing effect, which reduces damage to the vehicle involved in the rear impact and protects the occupants therein.

In FIG. 1, an arrow A indicates the force which emanates from the accident obstacle when the commercial vehicle impacts on this obstacle. Arrow B in FIG. 2 indicates the direction in which the force-absorbing elements 7 deform and whereby a controlled limited displacement of the transport-container-side abutments 6 takes place in the direction of the abutments 5 stationarily remaining on the chassis.

When having a correspondingly stiff construction, the bottom of a transport container 3 is relatively securely protected by way of the bearings 4 according to the invention against an uncontrolled impact onto the driver's cab 2 in the case of a collision. In order to ensure this protection along the whole height of the transport container 3 adjacent to the driver's cab 2, the upper area of the wall of the transport container 3 directly adjoining the driver's cab 2 is also protected with respect to the chassis 1 by way of one of the bearings 4 having a force-absorbing construction. This is achieved by means of a support which can be acted upon tensile stress and which may be in the form of a traction rope. This support 16 is mounted to the transport-container-side abutment 6 which is situated farthest to the rear in the driving direction. Such supports 16 are provided on each broadside of the transport container 3.

In the case of the above-described construction, the kinetic energy which is released during a collision by a cargo inside the transport container 3 is absorbed in the bearings 4 in such a manner that an uncontrolled, unreduced impact of the transport container 3 on the driver's cab 2 can be avoided. The safety of the crew of the driver's cab can be considerably increased in this manner in the case of a crash.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A commercial vehicle having a driver's cab, a chassis and a transport container which is fastened via a plurality of bearings on the chassis behind the driver's cab, said bearings being constructed to absorb impact energy in a driving direction, wherein a wall of the transport container which is adjacent the driver's cab is supported in a vertically upper area via a tension support diagonally extending to one of said bearings which is situated proximate the rearward end of the chassis.

2. A commercial vehicle according to claim 1, wherein said bearing has an impact-energy-absorbing component comprising a telescopic tube arrangement including an outside tube and an inside tube, walls of the outside and inside tube being connected with one another in one piece, the wall of the outside tube being deformed when the tubes are pushed into one another.

3. A commercial vehicle according to claim 1, wherein said bearing has an impact-energy-absorbing component comprising an energy-absorbing deformable, fiber-reinforced plastic part.

4. A commercial vehicle according to claim 1, wherein each of said bearings comprises:

an elongated guiding element which is rigidly fastened on the chassis via a front-side limiting cap and a rear-side limiting cap, said guiding element being aligned in the driving direction;

a bearing lug fixedly connected with the transport container being longitudinally displaceably disposed on said guiding element, said bearing lug being positioned adjacent said rear-side limiting cap; and a sleeve made of an energy-absorbing material being disposed around said guiding element in an area between said bearing lug and said front-side limiting cap.

5. A commercial vehicle according to claim 1, wherein said transport container comprises said wall located adjacent the driver's cab, which is substantially vertical, and a substantially horizontal wall extending rearwardly from a lower end of said substantially vertical wall.

6. A commercial vehicle having a driver's cab, comprising:

a chassis;

a transport container including a substantially vertical wall located behind said driver's cab and a substantially horizontal wall extending rearwardly from a lower end of said substantially vertical wall;

a plurality of bearings interposed between said chassis and said transport container, said bearings including a bearing portion connected to said chassis and a bearing portion connected to said substantially horizontal wall of said transport container;

a force-absorbing element connected to each of said bearings to absorb impact energy in a longitudinal vehicle direction; and a tension support connected to an upper area of said substantially vertical wall and connected to one of said bearings located proximate a rearward end of said chassis.

7. A commercial vehicle according to claim 6, wherein said force-absorbing element comprises a telescopic tube arrangement including an outside tube and an inside tube, walls of the outside and inside tube being connected with one another in one piece, the wall of the outside tube being deformed when the tubes are pushed into one another.

8. A commercial vehicle according to claim 6, wherein said force-absorbing element comprises an energy-absorbing deformable, fiber-reinforced plastic part.

9. A commercial vehicle according to claim 6, wherein each of said bearings comprises:

an elongated guiding element which is rigidly fastened on the chassis via a front-side limiting cap and a rear-side limiting cap, said guiding element being aligned in the driving direction; and a bearing lug fixedly connected with the transport container being longitudinally displaceably disposed on said guiding element, said bearing lug being positioned adjacent said rear-side limiting cap;

and wherein said force-absorbing element comprises a sleeve made of an energy-absorbing material disposed around said guiding element in an area between said bearing lug and said front-side limiting cap.

* * * * *